United States Patent
Greimann et al.

(10) Patent No.: US 10,821,954 B2
(45) Date of Patent: Nov. 3, 2020

(54) BRAKE SYSTEM FOR A VEHICLE

(71) Applicant: Ford Global Technologies, LLC, Dearborn, MI (US)

(72) Inventors: Ferdinand Greimann, Dormagen/NRW (DE); Erik Mueller-Wickop, Hamburg (DE); Karl-Peter Hesseler, Siegburg/NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 3 days.

(21) Appl. No.: 16/252,844

(22) Filed: Jan. 21, 2019

(65) Prior Publication Data
US 2019/0225206 A1 Jul. 25, 2019

(30) Foreign Application Priority Data

Jan. 25, 2018 (DE) .................. 10 2018 201 147

(51) Int. Cl.
| | |
|---|---|
| *B60T 13/74* | (2006.01) |
| *B60T 17/22* | (2006.01) |
| *B60T 7/12* | (2006.01) |
| *B60T 8/17* | (2006.01) |
| *B60T 8/00* | (2006.01) |
| *B60T 1/00* | (2006.01) |

(52) U.S. Cl.
CPC .............. *B60T 13/74* (2013.01); *B60T 1/005* (2013.01); *B60T 7/12* (2013.01); *B60T 8/00* (2013.01); *B60T 8/17* (2013.01); *B60T 13/741* (2013.01); *B60T 17/221* (2013.01); *B60T 2270/402* (2013.01); *B60T 2270/414* (2013.01)

(58) Field of Classification Search
CPC . B60T 13/74; B60T 1/005; B60T 7/12; B60T 8/00; B60T 8/17; B60T 13/741; B60T 17/221; B60T 2270/414; B60T 2270/402

USPC ......... 303/3, 15, 122.05, 191; 188/2 D, 156, 188/158, 162, 173
See application file for complete search history.

(56) References Cited

U.S. PATENT DOCUMENTS

| | | |
|---|---|---|
| 5,696,679 A | 12/1997 | Marshall et al. |
| 6,499,814 B1 | 12/2002 | Mixon |
| 6,702,405 B1 | 3/2004 | Balz et al. |
| 7,815,546 B2 * | 10/2010 | Jagodzinski ............ B60T 7/107 477/185 |

(Continued)

FOREIGN PATENT DOCUMENTS

EP 2719556 A1 4/2014

OTHER PUBLICATIONS

"Parking brake", Volvo Cars Support, V60 Plug-in Hybrid, 2016, Owner's Manual online, Aug. 6, 2017, http://support.volvocars.com/uk/cars/Pages/owners-manual.aspx?mc=312H&my=2016&sw=15w17&article=063c7e8bt78eea4dc0a801e800a131f7.

*Primary Examiner* — Pamela Rodriguez
(74) *Attorney, Agent, or Firm* — Raymond L. Coppiellie; Bejin Bieneman PLC

(57) ABSTRACT

The disclosure relates to a brake system for a vehicle, said brake system comprising a brake for securing the vehicle, wherein the brake comprises an actuator for actuating the brake. It is proposed to directly electrically connect an electrical connection for external energy sources to the actuator of the brake with the result that preferably only the actuator is externally supplied with electrical energy. Furthermore, the disclosure proposes a vehicle having the brake system, and a method for operating the brake system.

10 Claims, 3 Drawing Sheets

(56) References Cited

U.S. PATENT DOCUMENTS

| | | | | |
|---|---|---|---|---|
| 7,884,494 B2* | 2/2011 | Grimm | .................. | B60T 7/085 |
| | | | | 307/10.1 |
| 8,739,944 B1* | 6/2014 | Goodman | ............... | F16D 65/28 |
| | | | | 188/156 |
| 9,260,078 B2 | 2/2016 | Mederer et al. | | |
| 10,352,383 B2* | 7/2019 | Masuda | .................. | B60T 17/18 |
| 2014/0309900 A1* | 10/2014 | Frashure | ................. | B60T 17/22 |
| | | | | 701/70 |

* cited by examiner

BRAKE SYSTEM FOR A VEHICLE

CROSS-REFERENCE TO RELATED APPLICATION

This patent application claims priority to German Application No. DE 102018201147.8 filed on Jan. 25, 2018, which is hereby incorporated by reference in its entirety.

FIELD OF THE DISCLOSURE

The present disclosure relates to a brake system for a vehicle, said brake system comprising a brake for securing the vehicle and an actuator that actuates the brake. Furthermore, the disclosure relates to a method for releasing and/or securing a secured brake of a vehicle brake system.

BACKGROUND

A brake system is a fundamental assembly in the case of a vehicle. Such a brake system may be embodied as a parking brake that is used for the purpose of securing the vehicle in a parking position with the result that said vehicle may not be unintentionally moved. In modern vehicles, parking brake examples include a foot brake or a hand brake. These brake systems typically are connected via a mechanical device using cable pulls to the brake that secures the vehicle if the brake system is actuated in that at least one wheel of the vehicle is blocked.

More modern vehicles may comprise an electric parking brake. The brake system of the electric parking brake can comprise a brake that is actuated using an electrically-driven actuator. The brake may thus be embodied as a button in the passenger compartment. A user may actuate the button in a comfortable manner and may secure the vehicle without it being necessary for the user to apply the forces for blocking the wheel themselves. The actuator assumes, in this case, the function of applying the forces, said actuator utilizing electrical energy from an vehicle electrical system. This electrical energy may be supplied into the vehicle electrical system from a battery or a generator that is driven using a drive motor. In some examples, the drive motor may be an internal combustion engine or an electric machine. Further, the battery and the generator can be fixedly built into the vehicle and may not be immediately accessible. If the energy supply of the vehicle electrical system breaks down, for example, as a result of completely draining the battery, it thus may no longer be possible to release the parking brake and remove the blockage of the wheels. This may be problematic in the case of a drive motor that is switched off since the generator also then does not provide requisite electrical energy to move the actuator.

Such an electric parking brake may only then be released by virtue of the fact that a new battery is installed in the vehicle in a complex manner by means of manual measures or at least is connected in parallel to the drained battery. It likewise may no longer be possible to secure the brake (e.g., if electrical energy that is required for this purpose is no longer available in the vehicle electrical system). The following disclosure is therefore also related to securing the brake from a released state of the brake.

Some electrical brake systems are known from the prior art. By way of example, U.S. Pat. No. 6,499,814 discloses an automatic electronic open-loop control device for a brake of a trailer for a vehicle for braking during a driving operation. The operational requirements for using this brake system may be different from those of the brake system of a parking brake. For instance, in the trailer brake example, an open-loop control device may provide a connection to which an energy source that may be connected in parallel to the existing battery of the brake system. In this case, the subsequently parallel-connected energy source may supply the entire vehicle electrical system of the trailer (e.g., the energy source comprising a sufficiently high capacity). In this instance, a bulky and heavy energy source is desirable. Moreover, by way of example, a battery from a boat may be proposed as an energy source, said boat being loaded onto the trailer. It may also be proposed to use other energy sources that are typically "on board" (e.g., in other words, loaded onto the trailer). The disclosure proposed in U.S. Pat. No. 6,499,814 may not be operational if an energy source is not charged and not 'on board' since the proposed bulky energy sources may not be easily retrieved.

U.S. Pat. Nos. 6,702,405 and 5,696,679 propose to integrate an additional battery into the vehicle. This additional battery is fixedly built-in, and consequently not mobile. Furthermore, the additional battery is integrated into the vehicle electrical system. The additional battery is not only to activate the brake system in the event of a failure of the existing battery but rather to also assume further functions so that it is ensured the vehicle may be securely parked. This in turn requires a battery having a large capacity, which creates an increased weight and reduced mobility. The additional battery therefore significantly increases the weight of the vehicle.

Furthermore, documents such as EP 2719556A1 and U.S. Pat. No. 9,260,078 propose to provide an open-loop control unit having a connection in order to permit an external communication. However, these documents do not offer a solution in the event of a failure of the vehicle electrical system voltage or in the case of a dead battery.

In light of the demonstrated prior art, there is still room for improvements. The fixedly built-in or non-mobile energy sources that are configured to supply a vehicle electrical system with energy may be particularly susceptible to a locked parking brake in the event that the vehicle electrical system fails or becomes drained.

BRIEF DESCRIPTION OF THE DRAWINGS

Further, other examples of the disclosure are disclosed in the following description of the figures. In the drawings.

SUMMARY

Figure 1:
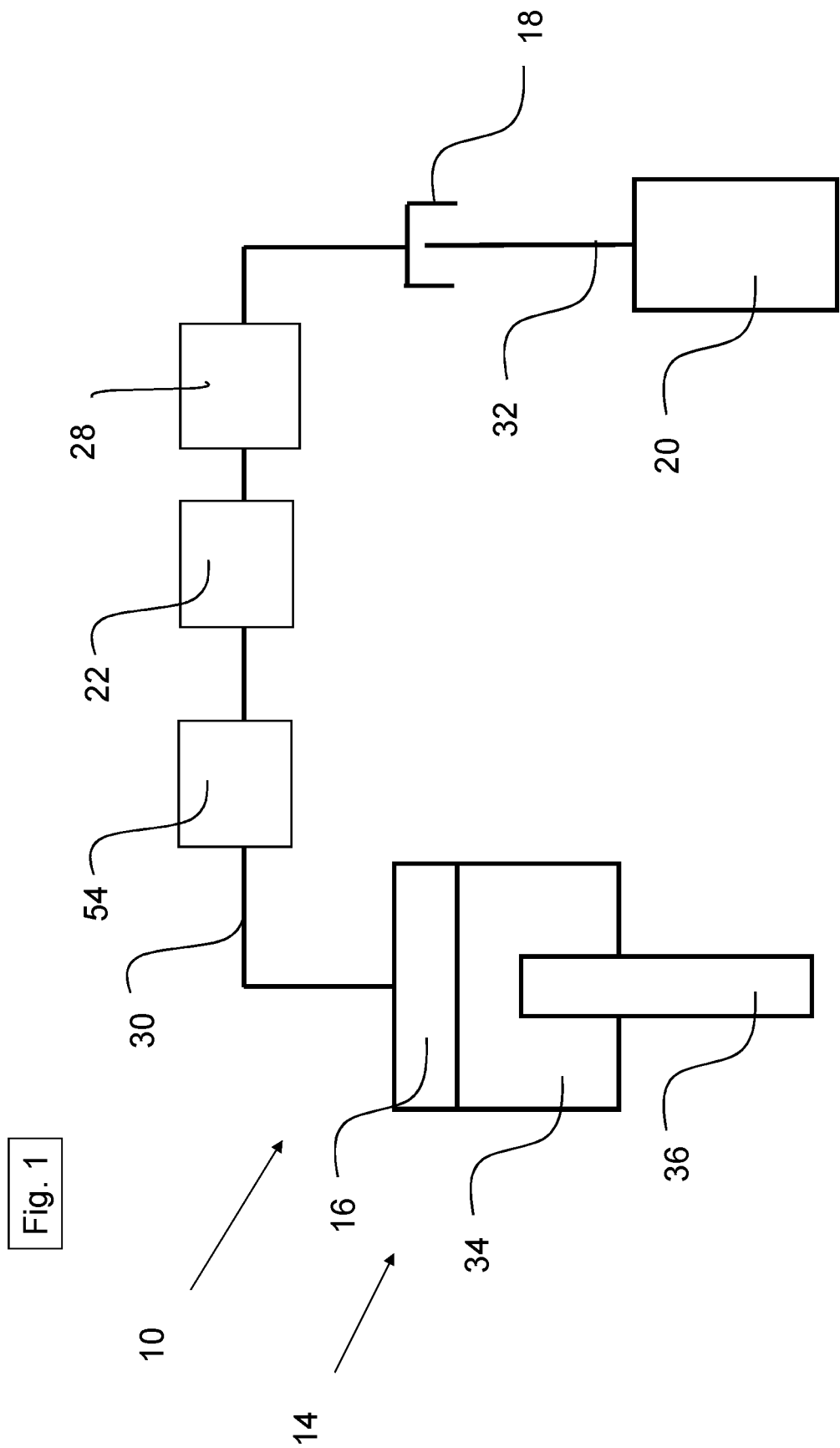
FIG. 1 illustrates a brake system in accordance with the disclosure.

The object of the present disclosure is to provide an aid for releasing a secured brake in particular in the case of a vehicle electrical system that has broken down, said aid to be simple to handle and simultaneously feature a high degree of flexibility with regard to selecting the energy source that is required in order to release the brake.

In accordance with the disclosure, the object is achieved by using a brake system that includes a brake for securing a vehicle, wherein the brake comprises an actuator for actuating the brake, wherein an electrical connection for external energy sources is directly electrically connected to the actuator of the brake with the result that only the actuator may be externally supplied with electrical energy. Moreover, the object is achieved by using a vehicle that comprises a brake system comprising a brake for securing the vehicle, wherein the brake comprises an actuator for actuating the brake, wherein an electrical connection for external energy sources in relation to the vehicle is directly electrically connected to the actuator of the brake with the result that only the actuator may be externally supplied with electrical energy. In this brake system implementation, the connection may be a serial connection (e.g., a USB connection), and/or the external energy source may be a mobile telephone, a smartphone, a laptop, a tablet computer, a smart watch, headphones or another external mobile device having an energy storage device. Further, the brake system may comprise a capacitor for storing electrical energy that is connected to the actuator (e.g., in parallel to the connection). Furthermore, in accordance with the disclosure, the object is achieved by using a method for releasing and/or securing a secured brake of a brake system, wherein the brake system comprises an electrical actuator that actuates the brake via at least the following steps: (a) connecting an external energy source to an electrical connection that is directly connected to the actuator; (b) supplying only the actuator with electrical energy; or (c) releasing and/or securing the brake using the actuator.

Reference is made to the fact that the features, arrangements, and functions that are individually disclosed in the description below may be combined with one another in an arbitrary, technically appropriate manner and demonstrate further embodiments of the disclosure. The description additionally characterizes and specifies the disclosure in particular in conjunction with the examples in the figures.

In accordance with the disclosure, the brake system of a vehicle comprises a brake for securing the vehicle. This brake is in particular a parking brake, wherein the parking brake is referred to below as the brake. Moreover, the vehicle will furthermore comprise a service brake, wherein the function of the parking brake may be integrated into the service brake. The brake is actuated by means of an actuator. The actuator cooperates with the brake in such a manner that, in at least one example, one wheel of the vehicle is blocked by using the brake. The brake may be embodied as a disk brake or drum brake. In at least one example, a disk brake is used, the brake caliper of said disk brake being mechanically connected to the actuator. In this case, the actuator actuates the brake linings that are arranged in the brake caliper, said brake linings being pressed onto a brake disk. The brake system in accordance with the disclosure comprises an electrical connection for external energy sources. The electrical connection is directly connected to the actuator with the result that electrical energy may be supplied from the outside in particular only to the actuator. As a consequence, only a small amount of energy is required for actuating the brake with the result that the external energy source only uses a small capacity. A secured brake may be released using such a brake system without, by way of example, starting the ignition of a vehicle in order to provide energy. The external energy source may consequently comprise a small construction size and a low weight. Such an external energy source that is lightweight may be particularly mobile. It is also possible that in the event of a broken-down vehicle electrical system to nevertheless provide sufficient energy to release the brake. Thus, the vehicle then may for example be pushed.

One aspect of the disclosure may comprise a serial connection as a connection. In particular, a USB connection is contemplated. A serial connection may be compatible with a plurality of devices with the result that it is not necessary to have a specific device as an energy source. In particular, a USB connection may be compatible with most common mobile devices with the result that these devices may be used as external energy sources.

A mobile telephone, a smartphone, a laptop, a tablet computer, a smart watch, headphones or another external mobile device having an energy storage device may be possible as an energy storage device. Such external energy sources are highly mobile and easy to handle. These devices comprise a rechargeable battery that may be connected via a connection by means of a cable to the connection of the brake system in order to use the electrical energy that is located in the rechargeable battery to actuate the brake. These devices frequently comprise a serial connection, in particular a USB connection with the result that the procedure of connecting said devices to the connection of the brake system is simple.

A capacitor for storing electrical energy may be connected to the actuator. This capacitor is connected in series between the connection and the actuator. If an external energy source is connected to the connection, the capacitor may then collect energy until a predetermined quantity of energy has been accumulated in the capacitor. The embodiment having a capacitor that is connected in series may be suitable in the case of an external energy source that comprises a capacity that is too low or that cannot discharge their energy at a sufficiently rapid rate. If the capacity of such an energy source is too low, additionally a second external energy source may be charged in the capacitor. If a discharge rate of an external energy source is too slow, the energy initially charged in the capacitor may be subsequently be discharged using a corresponding power. Alternatively, the capacitor may be used as a supplementary internal energy source. In the case of the alternative embodiment, the capacitor is built into the vehicle. In the case that the external energy source has stored too little energy, additional energy may thus be provided from the capacitor. The capacitor of the alternative embodiment may be charged via the generator or the existing battery in the vehicle if said capacitor has been drained. In this case, the capacitor may be connected in parallel to the connection. In the event of an emergency, a sufficient energy supply is ensured using the capacitor.

In accordance with the disclosure, such a brake system is integrated in the vehicle. The external energy source is not built into the vehicle and may therefore be outside the vehicle or may be brought into the passenger compartment. It is desirable that a connection of the brake system is arranged within and/or outside the passenger compartment. In particular, a connection may be attached to the body of the vehicle so as to be accessible from the outside. A user of the vehicle may thus in a simple manner supply the actuator with electrical energy without it being necessary in this case to perform a manual action (e.g., such as the user avoiding, by way of example, opening the hood and using a tool). According to one example, it may be expedient that the connection is arranged within the passenger compartment in order to thus avoid an undesired use of the connection by unauthorized persons.

According to one example, the electrical energy of the external energy source is only provided to the actuator, which is connected to the brake. According to at least one example, it may be preferred that other systems of the vehicle such as the ABS, ESP, the central open-loop control unit or further components of the brake system do not receive electrical energy via the connection, i.e., from the external energy source. Only a small quantity of electrical energy is necessary in relation to the electrical energy that is typically expended by the vehicle electrical system in order to actuate, in other words to release, the brake. In order to achieve the direct supply of the actuator, the connection may be connected to the actuator but not to the ABS, ESP, the central open-loop control unit or further components of the brake system. In at least one example, the connection is not connected to any other components.

In order to release a secured brake of the brake system by using an external energy source, the external energy source may be connected to the connection in accordance with the method via a cable. In this case, there is a direct energy flow from the energy source to the actuator that actuates, in other words releases, the brake. In this case, the brake releases the blockade of the wheel of the vehicle. It is desirable that a switch or a button is provided, which must be actuated in order to release the brake. If sufficient energy is provided using the external energy source, by way of example, in that said energy has sufficiently filled the capacitor, the switch or button may be actuated and an electrical connection between the actuator and the capacitor may be closed.

In the case of aspect of the disclosure, it may be provided that the secured brake may only be released if sufficient energy for releasing and subsequently securing the brake is available in the external energy source or in the capacitor. It may be desirable to have energy for securing the brake in reserve after releasing the brake in order to be able to stop an undesired and/or uncontrolled movement of the vehicle after releasing and/or securing the brake. This may be performed, by way of example, using the switch or button.

If the voltage of the electrical energy of the external energy source does not correspond to the nominal voltage of the actuator, the voltage may thus be adjusted using a voltage converter. In particular, the voltage may be increased in this case until the nominal voltage of the actuator is achieved.

DETAILED DESCRIPTION

Identical parts are always provided with the same reference numerals in the different figures. For this reason, in general these identical parts are also only described once.

FIG. 1 illustrates a brake system 10 in accordance with the disclosure for releasing and/or securing a secured brake 14 using an external energy source 20.

The brake system 10 comprises the brake 14. The brake 14 includes at least one actuator 16 and a brake caliper 34. The brake caliper 34 at least in part grips around a brake disk 36. The brake caliper 34 is actuated by means of the actuator 16 with the result that brake linings that are arranged in the brake caliper 34 press onto the brake disk 36 when the brake 14 is in the secured state.

The brake system 10 comprises a connection 18 for releasing and/or securing the brake 14, said connection being connected by means of a line 30 to the actuator 16. The external energy source 20 is connected to the connection 18. In this case, the external energy source 20 may be connected using a cable 32. The connection 18 is preferably a USB connection and the energy source 20 is in particular a mobile telephone, a smartphone, a laptop, a tablet computer, a smart watch, headphones or another external mobile device having an energy storage device.

If the quantity of energy that is contained in the external energy source 20 is not sufficient for the operation of the actuator 16, optionally a capacitor 22 may be additionally connected in series between the actuator 16 and the connection 18. The capacitor 22 collects energy of the external energy source 20 until sufficient energy is available for releasing and/or securing the brake 14. A check may be performed using a testing instance 46 as illustrated in FIG. 3 so as to check whether sufficient energy is available. The procedure of securing the brake 14 may be performed after releasing the brake 14 in an emergency if the vehicle 12 in FIG. 2 by way of example performs an unwanted movement after releasing the brake 14.

It may be desirable that a voltage converter 28 is integrated into the line 30 with the result that the voltage of the electrical energy of the external energy source 20 may be adjusted to the nominal voltage of the actuator 16 if the voltage of the external energy source 20 or of the capacitor 22 does not correspond to the nominal voltage of the actuator 16. Typically, the voltage of such an external energy source 20 or the capacitor 22 is lower or higher than the voltage of an actuator 16 of a brake 14 for securing a vehicle 12. This voltage that is too low or too high is then adjusted using the voltage converter 28.

Furthermore, a switch or button 54 may be integrated into the line 30. The switch or button 54 is used so as to release the energy for releasing and/or securing the brake 14. It is preferred that the switch or button 54 may only be actuated if sufficient energy for both releasing as well as securing 44 the brake 14 is available.

Figure 2:
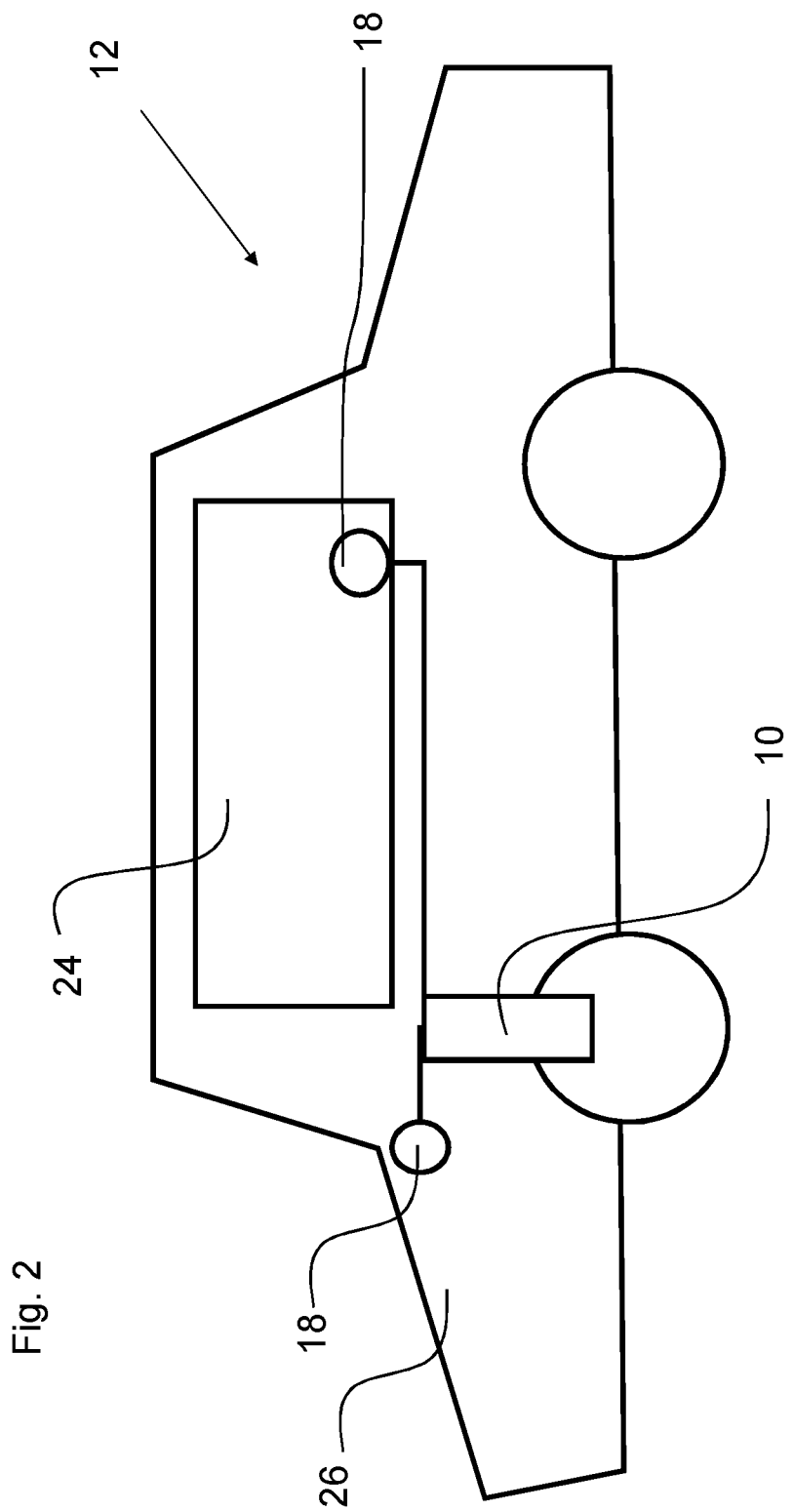
FIG. 2 illustrates a vehicle having the brake system.
Figure 3:
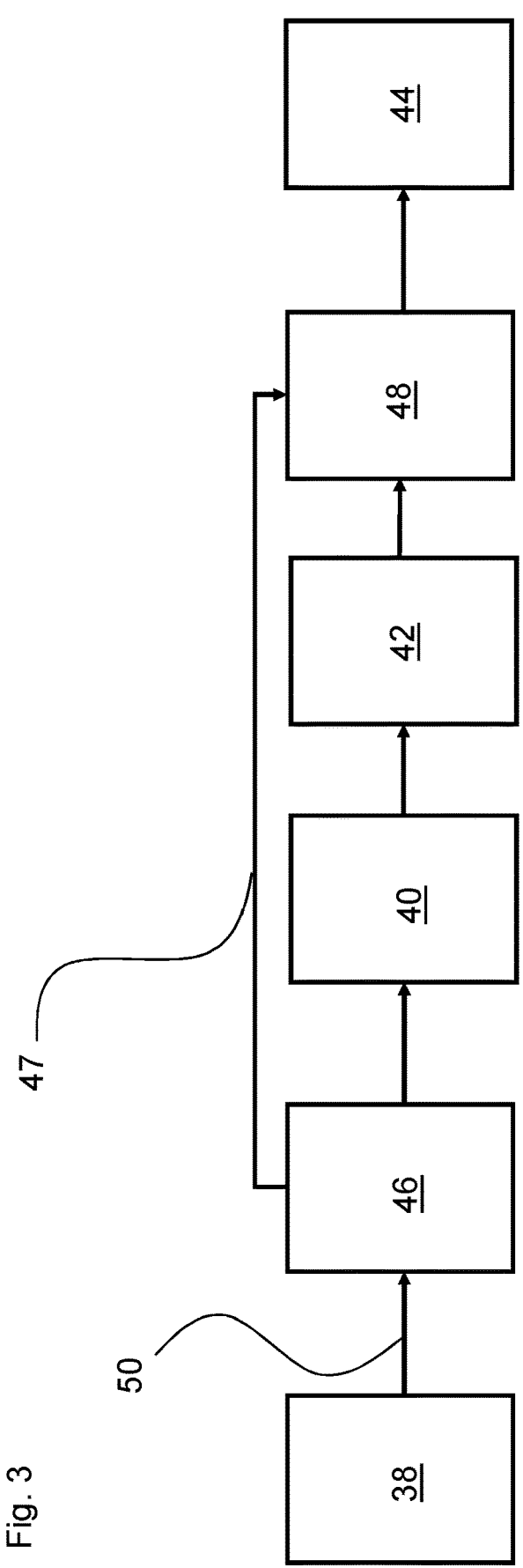
FIG. 3 illustrates a flow diagram of the operation of the brake system.

Such a vehicle 12 having the brake system 10 is illustrated in FIG. 2. The brake system 10 is arranged in the region of a wheel of the vehicle 12. In this case, the brake system 10 is connected via lines 30 to at least one connection 18. The connection 18 is arranged in a passenger compartment 24 of the vehicle 12 and/or outside the passenger compartment 24. For example, the connection 18 may be arranged outside the passenger compartment 24 in the region of the vehicle body 26. In other example, the connection 18 may be arranged inside the passenger compartment 24—e.g., on a center console, or on a dashboard, or another suitable preferably easily accessible site.

FIG. 3 illustrates a flow diagram for a method for operating the brake system 10. The method comprises the following steps:

Connecting 38 the external energy source 20 to the connection 18.

This leads to an energy flow 50 from the energy source 20 in the direction of the brake 14 within the brake system 10.

The electrical energy of the external energy source 20 is accumulated in a capacitor 22 until sufficient energy is available to actuate the actuator. If an external energy source 20 cannot supply sufficient energy, further external energy sources 20 may thus be drawn upon in order to fill the capacitor 22.

Testing 46 whether sufficient energy is available in the capacitor 22 to release 44 the brake 14 (or to secure 44 the brake 14).

Prior to the electrical energy of the capacitor reaching the brake 14, an adjustment 40 of the voltage may be performed using the voltage converter 28. This step is optional and may be avoided in the case of a suitable voltage along the path 47. This step may alternatively also be omitted in the method.

Actuating 48 the switch 54 in order to release the energy for releasing and/or securing 44 the brake.

Releasing and/or securing 44 the brake 14.

The two steps of adjusting 40 and supplementing 42 (capacitor functioning alternatively as a supplementary internal energy source) may be interchanged with one another. Likewise, the two steps may be avoided with reference to the path 47 if the quantity of energy and its voltage are sufficient for operating the actuator 16.

In the case of the disclosure, it is desirable that an emergency solution is provided in the case of which the brake 14 may be released and/or secured by means of the energy that is stored in the external energy storage device 20 if the vehicle electrical system has broken down or if too little energy can be made available for releasing and/or securing the brake 14. If the necessary energy is available in the vehicle electrical system or said vehicle electrical system has not broken down, it may not be necessary to use the external energy storage device 20.

The disclosure also includes in this respect the use of a connection 18, preferably a USB connection for connecting the external energy source 20 to the actuator 16, in order in the event of an emergency, in other words in the event of a failure of the vehicle electrical system or if the energy available in said vehicle electrical system is insufficient, to supply the actuator 16 with the necessary energy in order to be able to nevertheless release and/or secure the brake 14 despite the failed vehicle electrical system.

LIST OF REFERENCE NUMERALS

10 Brake system
12 Vehicle
14 Brake for securing the vehicle
16 Actuator
18 Connection
20 External electrical energy source
22 Capacitor
24 Passenger compartment
26 Vehicle body
28 Voltage adjusting means
30 Line
32 Cable
34 Brake caliper
36 Brake disk
38 Connecting to the connection
40 Adjusting the voltage
42 Collecting energy in the capacitor
44 Releasing/securing the brake
46 Checking the quantity of energy
47 Bypassing in the case of sufficient voltage
48 Actuating the switch
50 Energy flow
52 Vehicle electrical system
54 Switch or button

The invention claimed is:

1. A brake system for a vehicle, said brake system comprising a brake for securing the vehicle, wherein the brake comprises an actuator for actuating the brake, wherein
   an electrical connection configured to couple to at least one external energy source is directly electrically connected to the actuator of the brake so that only the actuator is externally supplied with electrical energy, and the at least one external energy source is separate from the vehicle.

2. The brake system of claim 1, wherein
   the connection is a serial connection, wherein the serial connection is a USB connection.

3. The brake system of claim 1, wherein
   the at least one external energy source is a mobile telephone, a smartphone, a laptop, a tablet computer, a smart watch, headphones or an external mobile device comprising an energy storage device.

4. The brake system of claim 1, wherein
   a capacitor for storing electrical energy is connected to the actuator and in parallel to the connection.

5. A vehicle comprising a brake system, comprising: a brake for securing the vehicle, wherein the brake comprises an actuator for actuating the brake, wherein
   an electrical connection configured to couple to at least one external energy source is directly electrically connected to the actuator of the brake so that only the actuator is externally supplied with electrical energy, and the at least one external energy source is separate from the vehicle.

6. The vehicle of claim 5, wherein
   the connection is at least one of arranged within a vehicle passenger compartment or, arranged outside the passenger compartment and is accessible from outside the vehicle body.

7. The vehicle of claim 5, wherein
   the connection is only electrically connected to the actuator, and is not connected to a vehicle anti-lock braking system (ABS), a central open-loop control unit of the vehicle, or to additional components of the brake system.

8. A method for releasing and/or securing a secured brake of a brake system, wherein the brake system comprises an electrical actuator that actuates the brake, the method comprising the following steps:
   a) connecting an external energy source to an electrical connection of a vehicle that is directly connected to the actuator, wherein the external energy source is separate from the vehicle;
   b) supplying only the actuator with electrical energy; and
   c) releasing and/or securing the brake using the actuator.

9. The method of claim 8, wherein
   a voltage of the electrical energy of the external energy source is adjusted to a nominal voltage of the actuator using a voltage converter.

10. The method of claim 8, wherein
    an electrical capacitor supplements the electrical energy of the external energy source with additional electrical energy.

* * * * *